United States Patent [19]

Nagano

[11] 4,149,233
[45] Apr. 10, 1979

[54] CIRCUIT FOR AUTOMATIC LOAD SHARING IN PARALLEL CONVERTER MODULES

[76] Inventors: Robert A. Frosch, Administrator of the National Aeronautics and Space Administration, with respect to an invention of, Satoshi Nagano, Long Beach, Calif.

[21] Appl. No.: 833,637

[22] Filed: Sep. 15, 1977

[51] Int. Cl.² ..................... H02M 3/335; H02P 13/18
[52] U.S. Cl. ..................................... 363/71; 363/134; 363/95
[58] Field of Search ................. 363/19, 21, 23, 25–26, 363/65, 71, 75, 78, 80, 95, 97, 90–91, 134

[56] References Cited
U.S. PATENT DOCUMENTS

| | | | |
|---|---|---|---|
| 2,824,274 | 2/1958 | Holt, Jr. | 363/71 |
| 3,254,302 | 5/1966 | Boykin et al. | 307/58 |
| 3,621,365 | 11/1971 | Beck | 363/71 |
| 3,806,792 | 4/1974 | Untamo | 363/100 |
| 4,002,963 | 1/1977 | Hunter | 363/80 |

Primary Examiner—William M. Shoop
Assistant Examiner—Peter S. Wong
Attorney, Agent, or Firm—Monte F. Mott; John R. Manning; Paul F. McCaul

[57] ABSTRACT

A nondissipative circuit for automatic load sharing in parallel converter modules having push-pull power transistors, each transistor having a separate current-sensing transformer and an impedance-adjusting transformer in series with its collector. The impedance-adjusting transformer functions as a current-controlled variable impedance that is responsive to the difference between the peak collector current of the transistor and the average peak current of all collector currents of power transistors in all modules, thereby to control the collector currents of all power transistors with reference to the average peak collector current.

7 Claims, 1 Drawing Figure

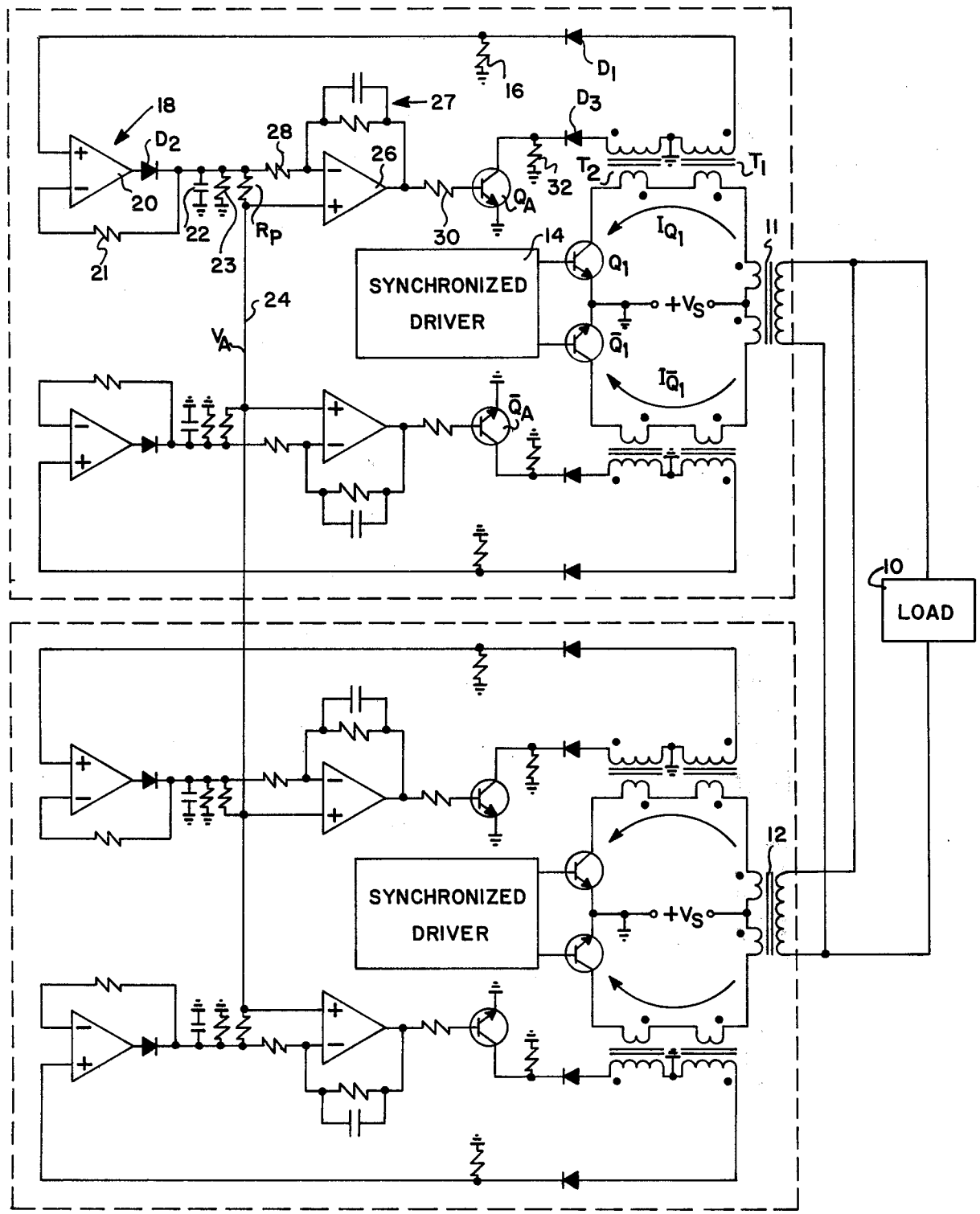

CIRCUIT FOR AUTOMATIC LOAD SHARING IN PARALLEL CONVERTER MODULES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to converters, and more particularly to a nondissipative circuit for equalized load sharing of power transistors.

The present approach for securing reliability of operation throughout the life of a spacecraft mission for the electrical power systems is to use small converter modules operating in parallel to achieve the required system rating. As is pointed out in a copending application Ser. No. 684,809 (now abandoned), titled METHOD AND APPARATUS FOR AUTOMATIC LOAD SHARING AMONG PARALLELED CONVERTERS, by Col. W. T. McLyman and G. W. Wester, new systems can be tailored to new requirements by adding or removing modules without the need for developing new circuit designs and incurring the attendant development costs. However, as also pointed out in that application, parallel operation often results in very large differences in load sharing among the modules and unbalanced operation of the power transistors of each individual module. This occurs because of the low impedance characteristics of each converter module, and the significant effect of slight parameter differences in components, such as the power transistors, power transformers, etc. Such inequalities and unbalanced operation can cause either module or component level overstresses which may produce premature failure.

The aforesaid copending application describes a method for equalizing load sharing in duty-ratio operated converter modules by appropriately adjusting the duty ratio of each module as a function of the differential load currents provided by each. The scheme described therein takes advantage of the fact that since the converter modules are driven by pulse width modulators, adjusting the pulse width of each individual converter modulator changes the duty cycle to effect the desired sharing of the load by all the converter modules. However, since inverter operation must always be with a fixed duty cycle of 50%, that technique cannot be used in systems using inverter modules. Also that technique does not achieve balanced operation of the push-pull transistors of the power output stage. The invention disclosed herein overcomes those limitations in a circuit for equalizing load sharing of power transistors in a converter operated as a DC-AC inverter or a DC-DC converter.

As will become apparent from the following description, a converter embodying the present invention may be operated to convert direct current into alternating current, i.e., operated as an inverter, or to convert direct current into direct current. Thus, although the generic term "converter" has come to be used almost exclusively for DC-DC converters, and a special term "inverter" has come into general use for DC-AC converters, the generic term "converter" will be employed hereinafter to encompass both DC-DC and DC-AC converters. However, because the embodiment disclosed to illustrate the concept of the invention in a specific embodiment is a DC-AC converter, it will be referred to by the special term "inverter."

SUMMARY OF THE INVENTION

In accordance with the present invention, each power transistor of paralleled converter modules has two transformers connected in series to its collector. One transformer functions as a current-sensing element to provide a signal to a peak detector proportional to the collector current being delivered to a load. The output of the peak detector is connected to a circuit for developing a peak average signal from all transistors. This peak average signal is then compared with the detected peak signal of each power transistor to produce a difference signal that is applied to a control transistor connected to the secondary winding of the other transformer which functions as a current-controlled impedance to increase, or decrease, the collector current of the power transistor to the peak average signal. To achieve this, the impedance-adjusting transformer has its secondary winding connected at one end to circuit ground and at the other end to the collector of the control transistor through a diode. A collector voltage resistor is connected between the collector of the control transistor and circuit ground to develop the necessary collector voltage for the control transistor to conduct while the collector current amplitude is controlled by the difference signal at its base. The collector voltage resistor is selected to be large so that little current flows through it, thereby reducing any dissipation of power by the control circuit to virtually that dissipated in the primary winding of the impedance-adjusting transformer the impedance of which is proportional only to the difference between the detected peak and the average peak. Since this impedance becomes very small when all the collector currents are balanced, power dissipation is minimized.

BRIEF DESCRIPTION OF THE DRAWING

The sole FIGURE shows a circuit diagram of a preferred embodiment of the invention.

DESCRIPTION OF PREFERRED EMBODIMENTS

Referring now to the drawings, there is disclosed a plurality of inverters connected in parallel to a load 10 through output transformers 11 and 12, each having two primary windings connected to a DC power source, $+V_s$. Since all of the paralleled inverters separated by dotted lines are identical in configuration and operation, only one inverter will be referred to specifically, and since each inverter has two identical channels operated in alternate or push-pull fashion, only one channel will be described in detail.

Each of the primary windings of the transformer 11 is connected to the power source, $+V_s$, through a transistor $Q_1$. One of the transistors is distinguished by a bar over the reference character $Q_1$ to denote that its operation is complementary to the other transistor. In other words, when transistor $Q_1$ is driven into conduction the transistor $\overline{Q_1}$ is cut off, and vice versa. In that manner, the DC power source $+V_s$ is transformer-coupled into the load in a push-pull fashion. A synchronized driver 14 alternately turns the power transistors on.

When a power transistor is turned on, such as transistor $Q_1$, its current, $I_{Q1}$, flows through the primary of the output transformer 11, the primary winding of a current transformer, $T_1$, and the primary winding of a second current transformer $T_2$, in series. One end of the secondary winding of each of these transformers $T_1$ and $T_2$ is connected to circuit ground. The other end of the transformer $T_1$ is connected by a diode $D_1$ to a large resistor 16 to provide a voltage signal proportional to the current amplitude sensed by the transformer $T_1$. That voltage signal is applied to a peak detector 18 which is comprised of an operational amplifier 20, diode $D_2$, negative feedback resistor 21, capacitor 22 and resistor 23. There is a peak detector for each of the power transistors $Q_1$ and $\overline{Q_1}$ of every inverter.

The output of each peak detector is connected to a common bus 24 by a resistor $R_P$. The bus thus serves as a summing junction to produce a voltage signal, $V_A$, that is the average of the peak detected by all peak detectors, i.e., the average of the collector current delivered by the transistor $Q_1$ and $\overline{Q_1}$ of all inverters to the load 10 through the output transformer 11.

The detected peak of a particular transistor, such as for the transistor $Q_1$, is compared to the average $V_A$ by a difference amplifier 26 having an RC negative feedback circuit 27 and an input resistor 28. The difference drives a control transistor $Q_4$ via a coupling resistor 30 to control its collector current. The collector of the control transistor is connected to the secondary winding of the transformer $T_2$ by a diode $D_3$, and to a large resistor 32. The latter is connected to circuit ground and serves to convert the current through the diode $D_3$ to a positive voltage for the collector of the transistor $Q_4$. However, little current flows through that large resistor, and the amount of current through the control transistor $Q_4$ will depend upon the difference signal from the difference amplifier 26. In that manner any power transistor which tends to decrease its share of current to the load will produce a lower peak voltage and a greater difference signal to cause its control transistor to conduct more current, thereby increasing current in the secondary winding of the transformer $T_2$ to decrease its internal impedance to the current $I_{Q1}$ through the primary winding of the transformer $T_2$. That will increase current through the output transformer and the current-sensing transformer $T_1$ until the peak voltage detected equals the average, $V_A$. Operation during alternate half cycles for the transistor $\overline{Q_1}$ of each inverter is the same.

In summary, the collector circuits of each of two push-pull power transistors $Q_1$ and $\overline{Q_1}$ include two current transformers in series, a first transformer $T_1$ to function as a linear current-sensing transducer in conjunction with a current-sensing resistor 16 and series diode $D_1$, and a second transformer $T_2$ to function as an internal impedance adjustor to balance the collector current of the power transistor with the average peak output detected from all other inverters. Each current-sensing transformer is connected to a separate peak detector the output of which is connected to a resistor $R_P$ across both inputs of a difference amplifier 26 and to the non-inverting input of each difference amplifier such that the outputs of all peak detectors are connected together by resistors in a star configuration to derive the average signal, $V_A$, of all the currents delivered to the load by the power transistors. This average signal serves as a reference for each of the difference amplifiers for comparison with the individual peak value.

If the average signal is larger than the peak voltage signal for a particular power transistor, such as when the collector current of the $Q_1$ transistor is less than the average of all the transistors, then the output of the difference amplifier 26 goes positive, turning on the control transistor $Q_4$ and making its emitter-collector impedance go low. This is reflected to the secondary winding of current transformer $T_2$. Since the collector circuit of transistor $Q_1$ then has a lower impedance, its collector current $I_{Q1}$ increases. Conversely, if the peak is larger than the average, the collector impedance of transistor $Q_1$ goes higher, decreasing the current $I_{Q1}$.

Since the collector currents of all the power transistors are controlled with reference to the average peak collector current, all will be automatically set at the same peak level, and the load will be shared equally, with each module operating with its output transistors balanced on each half-cycle. The advantage over the inserted resistance arrangement of the prior art is that the additional impedance inserted in each collector circuit is proportional only to the difference between the individual peak collector current and the average of all the peak collector currents. This impedance becomes very small when all the collector currents are balanced, or nearly so, and thus additional power dissipation is minimized. Also of great advantage is that not only are the converter modules balanced, but push-pull power transistors within the individual modules are balanced as to the current they deliver to the load. Another advantage pointed out hereinbefore is that this arrangement is effective not only for inverters having fixed duty cycles, but also for converters which are balanced by use of the variable-duty pulse modulation technique for application in any field in which power conditioning is utilized. Such applications range from space to terrestrial usages, such as in computer power supplies, solar electric collection systems, electric vehicles and the like.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. A circuit for automatic load sharing among parallel-connected converter modules, each module having push-pull connected power transistors, and each transistor having a separate current-sensing transformer and an impedance-adjusting transformer with their primary windings connected in series with the collector of the transistor, said impedance-adjusting transformer having its primary winding functioning as a current-controlled variable impedance responsive to a current in the secondary winding that is proportional to the difference between the peak collector current of the transistor and the average peak current of all collector currents of power transistors in all modules, said circuit including means connected to the secondary winding of said current-sensing transformer for detecting said peak collector current, means connected to all peak detecting means for producing said average peak current of all peak collector currents, means responsive to the difference between the peak collector current of a particular power transistor and said average peak current for producing an error signal proportional to said difference, and means responsive to said error signal for controlling current through the secondary winding of the impedance-adjusting transformer connected in series with the collector of said particular power transistor, thereby to control the collector currents of all power transistors with reference to the average peak collector current.

2. A circuit as defined in claim 1 wherein said means responsive to said error signal for controlling current through the secondary winding of the impedance-adjusting transformer connected in series with the collector of said particular power transistor is comprised of a control transistor having a base, emitter and collector, and its collector is connected to circuit ground by a resistor and is also connected to one end of said secondary winding of said impedance-adjusting transformer, and where the other end of said secondary winding of said impedance-adjusting transformer is connected to a source of potential.

3. A circuit as defined in claim 2 wherein said source of potential to which said other end of said secondary winding of said impedance-adjusting transformer is connected is circuit ground.

4. A circuit as defined in claim 3 wherein the emitter of said control transistor is connected to circuit ground, and the base of said control transistor is connected to receive said error signal.

5. A circuit as defined in claim 4 wherein said secondary winding of said impedance-adjusting transformer is connected to the collector of said control transistor by a diode.

6. A system for connecting a plurality of converter modules in parallel to a load and for regulating the current from each converter module to be substantially equal to the average peak current from all converter modules, each converter module having at least one power transistor that is switched off and on to deliver current to said load through an output transformer, each power transistor of paralleled converter modules having two transformers having primary windings connected in series to its collector, one transformer functioning as a current-sensing element to provide a signal on its secondary winding proportional to the collector current being delivered to a load, a peak detector connected to the secondary winding of said one transformer to detect the peak current being delivered to the load and to produce a peak signal proportional to that peak current, a circuit connected to the output of each peak detector for developing a peak average signal of all currents to the load from all power transistors, means for comparing said peak average signal with the detected peak signal of each power transistor to produce a difference signal, a control transistor having a collector, emitter and base, and having its collector connected through a diode to the secondary winding of the other transformer which functions as a current-controlled impedance to regulate the collector current of the power transistor to the load, its collector connected to circuit ground by a resistor, its emitter connected to circuit ground and its base connected to receive said difference signal, said impedance-adjusting transformer having its secondary winding connected at the other end to circuit ground.

7. A system for regulating the current from a plurality of converter modules to a load, each converter module having a separate peak detector, difference amplifier, averaging resistor, control transistor, having a base, collector and emitter, a control resistor, a control diode, two push-pull connected power transistors connected to separate primary windings of an output transformer, the secondary winding of said output transformer being connected in parallel with secondary windings of output transformers of other converter modules delivering current to said load, each power transistor having two current transformers connected with their primary windings in series, a first transformer to function as a linear current-sensing transducer in conjunction with a current-sensing resistor in parallel and series diode, and a second transformer to function as an internal impedance adjustor to balance the collector current of the power transistor with the average peak output detected from all other inverters, each current-sensing transformer having its primary winding connected by said diode to said separate peak detector the output of which is connected to said averaging resistor across both inputs of said difference amplifier and to the non-inverting input of every difference amplifier of every converter module, whereby the outputs of all peak detectors are connected together by averaging resistors in a star configuration to derive an average signal of all the peak currents delivered to the load by the power transistors, said average signal serving as a reference for each of the difference amplifiers for comparison with output of individual peak detectors, means for connecting the output of said difference amplifier to the base of said control transistor, said control transistor having its emitter connected to circuit ground, its collector connected to the secondary winding of said second transformer through said control diode, and to circuit ground through said control resistor.

* * * * *